Feb. 6, 1940.  W. F. STIMPSON ET AL  2,188,965
WEIGHING SCALE
Filed March 6, 1937   2 Sheets-Sheet 1
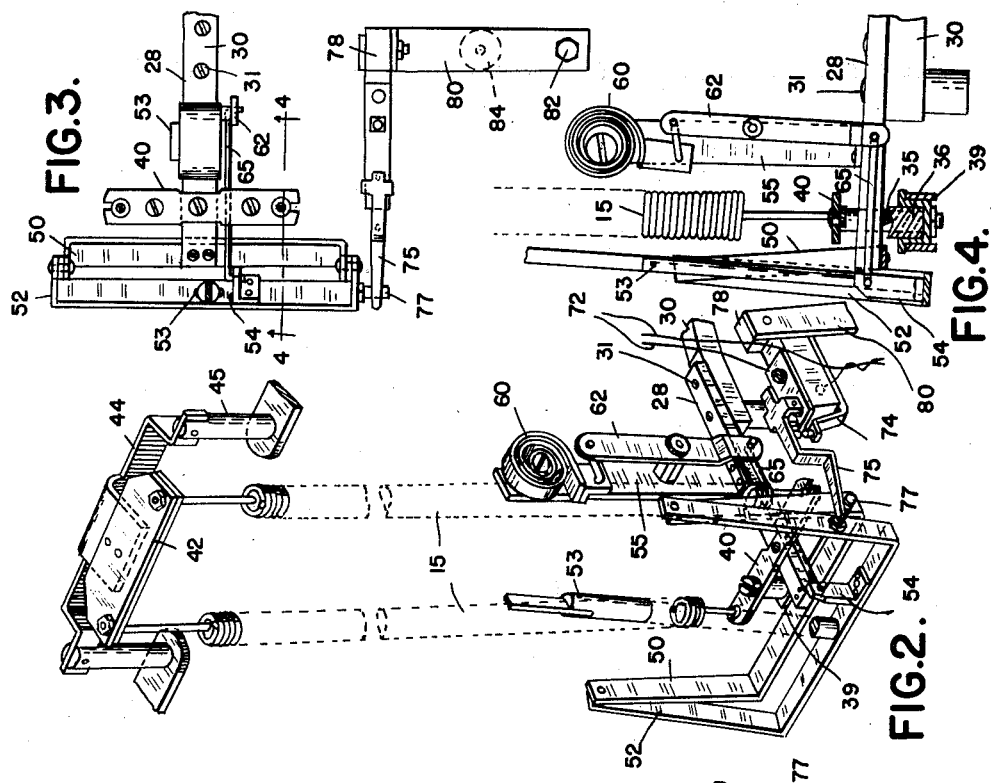
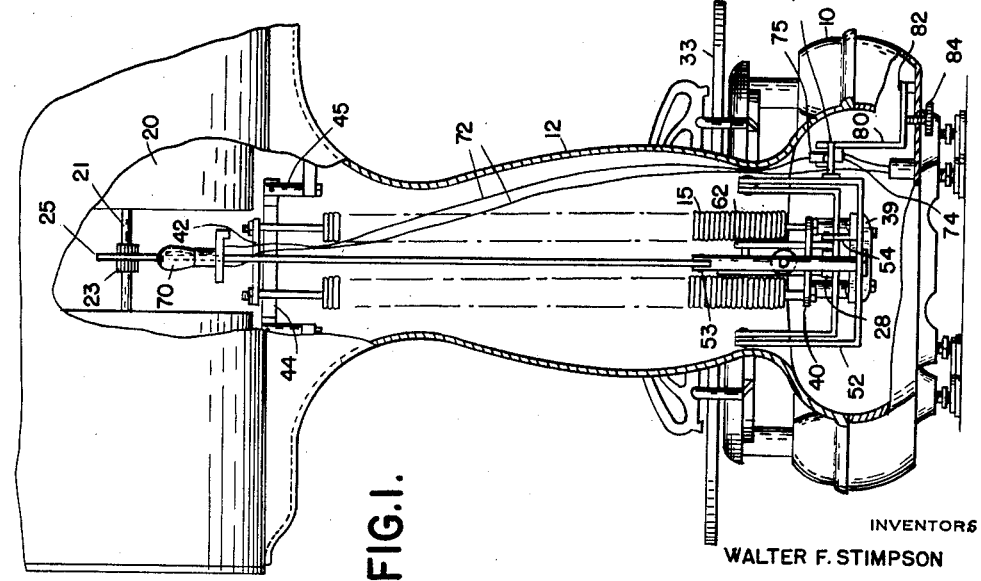
INVENTORS
WALTER F. STIMPSON
MODESTE J. LACHANCE
BY
ATTORNEYS

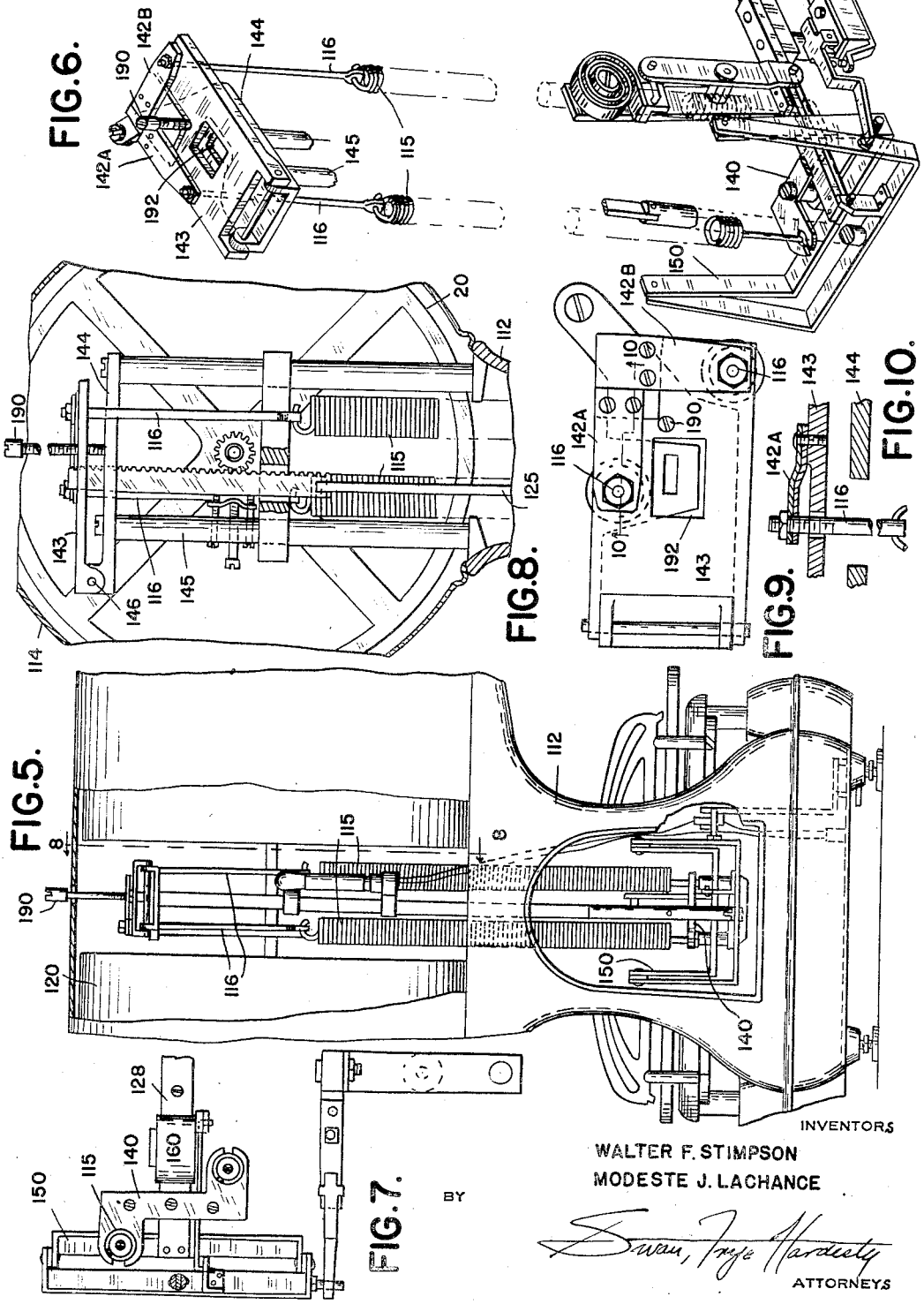

Patented Feb. 6, 1940

2,188,965

UNITED STATES PATENT OFFICE 2,188,965

WEIGHING SCALE

Walter F. Stimpson and Modeste J. Lachance, Louisville, Ky.; said Lachance assignor to said Stimpson Application March 6, 1937, Serial No. 129,366

6 Claims. (Cl. 265—69)

This invention relates to weighing scales of the spring-counterbalanced type, and particularly to improved thermostatic compensating means for offsetting the disturbing effects of temperature changes upon such scales.

Computing scales of the cylinder type are commonly provided with a base portion which acts as a housing for a lever system upon which rests the load receiving platform, while an upstanding column at the back of the scale encloses the load counterbalancing springs and supports at its top a chart housing, within which is a drum-like chart rotatable upon a horizontal axis and actuable by a rack rod or the like, both the springs and the rack rod being ordinarily connected at their lower ends to the lever system. A frequently used method of thermostatic correction comprises varying the initial position of the spring-supporting means, to partly or entirely offset the effects of temperature changes upon spring length. This method of correction properly maintains the zero adjustment, but frequently fails to effect accurate correction throughout the entire range of scale operation. Difficulty is also encountered if reliance is placed entirely upon another well-known method of temperature correction, which involves changing the position of the rack-rod. In accordance with the present invention, complete and accurate temperature correction throughout the entire range of scale readings is secured by providing a pair of separate but cooperating thermostatic means, one controlling the longitudinal spring position and the other controlling the effective travel of the rack rod, or other chart actuating means. By means of the dual thermostatic construction disclosed, we have found it possible to reduce the power and size, and consequently the expense, of the thermostatic compensating means required to effect complete correction, that is, to move properly both the springs and the rack rod. The present invention accordingly aims to provide improved and simplified thermostatic means acting cooperatively upon the springs and rack rod but utilizing separate thermostatic motor means in novel arrangement, one acting upon the spring means, and the other upon the rack rod.

Another important object comprises the provision of a scale of the type indicated having a fixed nose iron construction, and spring means connected thereto upon a fixed axis, together with chart actuating means also connected to said nose iron but having its point of connection thereto thermostatically variable to compensate for temperature changes.

A further object comprises the provision of improved and simplified means for connecting the springs and rack rod to the nose iron, and for mounting that one of the thermostatic motor means which acts to vary the point of connection of said rack rod to the nose iron.

Other objects and advantages will be apparent from the following description, wherein reference is made to the accompanying drawings illustrating preferred embodiments of our invention and wherein similar reference numerals designate similar parts throughout the several views.

In the drawings:

Figure 1 is a rear elevational view of a weighing scale incorporating the principles of this invention, the housing and other parts being broken away and shown in section.

Figure 2 is a perspective view of the nose iron, spring and rack rod assembly and thermostatic means, the rack rod being partly broken away.

Figure 3 is a horizontal section of such portions, taken directly above the thermostat used for rack adjustment, and looking downwardly.

Figure 4 is a vertical section taken substantially as indicated by the line 4—4 of Figure 3, looking in the direction of the arrows.

Figure 5 is a rear elevational view, partly broken away, of a scale incorporating the invention in somewhat modified form.

Figure 6 is a perspective view, similar to Figure 2 and of equivalent parts, of the modified construction.

Figure 7 is a horizontal section similar to Figure 3, of the modified construction.

Figure 8 is a vertical section taken substantially on the line 8—8 of Figure 5 and looking in the direction of the arrows.

Figure 9 is a detailed plan view of the supporting means for the upper ends of the springs, showing the thermostatic compensating means incorporated therein.

Figure 10 is a detailed section taken substantially on the line 10—10 of Figure 9, looking in the direction of the arrows.

Referring now to the drawings, in which the scale housing is shown as of a well-known variety, comprising a flat, hollow base 10, carrying at its rear an upstanding hollow column 12 which houses the counterbalancing springs 15 and carries at its top a transverse cylindrical housing 14 for the drum chart 20; it will be seen that the chart is of the "double" variety having an open mid-portion permitting access to the shaft 21 upon which the chart is mounted. Actuating means for the chart comprises a pinion 23 centrally carried by shaft 21, and a rack rod 25 meshing with the pinion and extending downwardly through the column, the rod being articulated at its lower end, by means presently to be described, to the nose iron 28, while the nose iron in turn, is rigidly carried upon the end of the main lever 30.

The main lever is housed within the base 10, and actuable in response to loading of the scale. For this purpose it is connected (by means not shown but of any ordinary or desired variety) to the platform 33. As best shown in Figure 4, the nose iron 28 carries upon its under side a knife-edge bearing 35, resting in a bearing block 36 carried by a stirrup member 39, which extends crosswise beneath and upwardly upon either side of the nose iron, carrying at its top a transverse spring-holding plate 40. Since the nose iron is rigidly secured to lever 30, as by screws 31, the axis of attachment of the springs 15 is fixed with respect to the nose iron and lever.

At their upper ends the springs are secured to the projecting ends of a relatively stiff plate 42 formed of bi-metal and centrally supported by means of a bracket 44, rigidly carried by the frame of the scale and shown mounted upon posts 45 carried by the column 12. The arms of bi-metallic plate 42 thus furnish cantilever support for the springs, and so act as to lower the upper ends of the springs upon contraction of the latter due to temperature drop, and vice versa.

Fixedly carried by and projecting upwardly from the end of nose iron 28 is a U-bracket 50, to the upper ends of the arms of which are articulated the arms of a swingable U-member or yoke 52. Yoke 52 supports the lower end of a rack rod 25, which is secured thereto, the rack rod preferably incorporating a central pivot joint 53 to prevent the imposition of strains upon the rack rod by reason of swinging of the yoke 52 or movement or vibration of the lever and nose iron system.

Yoke 52 is swingable to move the point of rack rod connection in and out with respect to the lever axis. A spirally coiled bi-metallic thermostat member 60 acts as a motor to move the yoke inward upon a rise of temperature, and outward when the temperature falls. A lever 62 is centrally pivoted to the upright 55 which supports the thermostat. The upright support 55 is rigidly secured to the nose iron, and the lever is at its upper end actuable by the thermostat through a link 65, lying substantially in the plane of the nose iron and at its forward extremity pivoted to a bracket 54 fastened to yoke 52.

When yoke 52 is swung by bi-metallic element 60, the rack rod may pivot about the pinion without turning the latter or changing the zero adjustment of the chart. The effect of the movement of the rack rod in and out by the thermostat then merely spreads or decreases the extent of chart actuation in proportion to any given lever deflection, by reason of the greater or lesser travel of the rack rod, due to increased or decreased angularity thereof with respect to the lever and pinion, and distance from the lever axis.

Chart illuminating means is shown, comprising an incandescent bulb 70 arranged in the chart housing to illuminate the chart drum, connectible as by means of wires 72 to a source of electrical energy (unshown), a switch having a fixed contact 74 and a swingable contact arm 75 being arranged in series therewith. When the scale is unloaded, the switch is normally held in open position by the pin 77, carried by yoke 52. The pin then holds arm 75 in slightly raised position, separating the contacts. When the scale is loaded, the descent of the nose iron carries the pin downwardly, allowing the contact arm to close upon the fixed contact and complete the circuit. Since the bi-metallic element 60 moves the yoke 52 and so pin 77 inwardly upon increase of temperature, any changes due to temperature rise cannot cause the switch to close, as the inward movement of the pin slightly raises the movable switch arm 75, exerting a cam-like action upon the upwardly bent end of such switch arm.

The switch body comprises an insulating block 78 upon which the contacts are secured. The body is carried by a support 80 formed of strap metal and extending downwardly to the base 10, to which it is secured at its end, as by means of the screw 82, as best shown in Figure 1. A portion of the strap metal support 80 extends in parallel relation to the bottom of the base, and an adjusting screw 84 threaded in the bottom of the base and projecting therethrough into engagement with the under side of the support 80, enables flexing the strap to move the switch bodily up and down, the knurled head of the screw being accessible from outside and beneath the base. The adjusting screw provides for initial adjustment of the switch setting, whereby the operator of the scale may fix the degree of scale loading necessary to operate the illuminating means.

The modified construction shown in Figures 5 to 10 inclusive is especially adapted for use in short column cylinder scales, and enables the use of a shorter column than would otherwise be possible. The counterbalancing springs 115 extend upwardly into the space between the divided sections of the chart 120, as best shown in Figure 5. To permit this, the spring axes are arranged in a common plane which is oblique to both the nose iron and the chart axis, as best shown in Figures 6 and 7. The lower spring supporting plate 140 is bent in opposite directions at its ends, to allow location of the springs closer to the central vertical plane in which the nose iron moves. The staggered disposition of the springs thus provided will be seen not only to so reduce the space they consume transversely of the scale as to enable extension of the springs between the chart sections, but to provide clearance for the supporting posts 145 carried by the column 112 of the scale. While the springs in the embodiment illustrated extend upwardly only part way into the chart housing, it will be appreciated that the column could be still further shortened, allowing the springs to extend still farther into the chart housing, and closer at their upper ends to their supporting plate 143. The length of the upper spring-connecting rods 115 indicates the additional usable spring space in the chart housing 114.

At their upper extremities the points of spring connection are located similarly to the centers of connection provided by lower plate 140, the upper plate 143 to which the springs are attached being manually shiftable up and down for zero adjustment, as by means of an adjusting screw 190 threaded in plate 143 and projecting through and downwardly from the bottom thereof into engagement with the transverse supporting plate 144 to which plate 143 is at one end hinged, as upon pivot pin 146. It will be seen that by reason of the abutting engagement of the screw 190 with plate 144, plate 143 may be shifted bodily by simply turning the screw, to raise and lower the springs and nose iron, and through them the rack rod 125, thus providing for zero adjustment of the scale.

The spring rods 116 are not connected directly to the plate 143, but to the free ends of cantilever bi-metallic strips 142A and 142B, the end of each strip supporting one spring, and being so arranged that under temperature changes it adjusts vertically the upper spring connection, and so moves the spring bodily, in similar fashion to the functioning of thermostatic plate 42, already explained. As best shown in Figure 10, the spring rods extend freely through openings in plates 143—144, to points of connection with the ends of the bi-metallic elements. Openings as 192 may also be provided in plates 143—144, through which openings the rack rod may extend and freely travel.

The supporting means for the upper ends of the springs will be seen to be similar to that disclosed in the application of Carl L. Conners and Modeste J. Lachance, Serial No. 66,564, filed March 2, 1936, while the connecting means for the lower ends of the springs conforms to that already described in connection with Figures 1 to 4 inclusive, except that the lower spring connecting plate 140 is shaped to stagger the points of connection of the lower ends of the springs. As best shown in Figure 7, such connection results in location of one of the springs beside and close to the bi-metallic thermostat element 160, while the other spring lies directly above the rack rod U-bracket support 150. It is believed that the rest of the lower spring and rack rod connecting portions being similar to those already explained in connection with the first embodiment, need no detailed description. Like reference characters, but one hundred integers higher, have been applied to corresponding parts.

While it will be apparent that the illustrated embodiments of our invention herein disclosed are well calculated to adequately fulfill the objects and advantages primarily stated, it is to be understood that the invention is susceptible to variation, modification and change within the spirit and scope of the subjoined claims.

What we claim is:

1. In a weighing scale, load receiving means, load counterbalancing spring means, weight indicating means, and means connecting the load receiving means to the counterbalancing spring means and to the weight indicating means, comprising a lever and an actuating rod means articulating the spring means at one end to the lever upon an axis fixed against movement longitudinally of the lever, said rod and spring means extending substantially parallel to each other and perpendicular to the lever, thermostatic means supporting the other end of the spring means and adapted to bodily move the same in response to temperature variations, and thereby also to shift the position of the lever and spring means, means bodily movable longitudinally of the lever and articulating said actuating rod thereto, and additional thermostatic means for shifting said last mentioned means without affecting the spring means.

2. A weighing scale of the cylinder-computing type including a base, a column upstanding from the base, and a chart housing carried by the column, a load-receiving platform supported above the base, a chart within the chart housing and having a gap in vertical alignment with at least a part of said column, a lever in the base, load counterbalancing spring means located at least partly in the column and connected to the lever in the base, and means supporting the upper end of said spring means from beneath and extending upwardly into the chart housing and into said gap in the chart, thermostatic means in the chart housing and connected to the upper end of said spring means for moving the same in response to temperature changes, an actuating element also extending through the column and connecting said lever to the chart to drive the latter, and separate thermostatic means for varying the effective location of the connection between said actuating element and lever.

3. A weighing scale construction as set forth in claim 2 in which said second mentioned thermostatic means is supported by and movable with the lever.

4. A weighing scale construction as set forth in claim 2 in which said second mentioned thermostatic means is supported by and movable with the lever, and connected to the actuating element to move the same toward and from the axis of the lever.

5. A weighing scale construction as set forth in claim 2 including means connecting said actuating element to the lever, comprising an arm swingably carried by the lever, means articulating the actuating element to the arm, said thermostatic means being carried by the lever and arranged to swing the arm to change the point of connection of the actuating element and lever.

6. In a weighing scale, in combination with load receiving means, load counterbalancing spring means, weight indicating means, means connecting the load receiving means to the counterbalancing spring means and to the weight indicating means, comprising a lever and an actuating rod for said weight indicating means, bearing means articulating the spring means to the lever upon an axis fixed against movement longitudinally of the lever, means bodily movable longitudinally of said lever for articulating said actuating rod thereto, thermostatic means for moving at least a portion of said spring means longitudinally to compensate partly for the effect of temperature changes thereupon, and separate thermostatic means for shifting said bodily movable means to change the position of the connection between the actuating rod and lever, and thereby to change the amount of spring deflection required for a given actuation of the weight indicating means.

WALTER F. STIMPSON.
MODESTE J. LACHANCE.